United States Patent [19]

Jespersen et al.

[11] 4,310,020
[45] Jan. 12, 1982

[54] PROCESSING CHAMBER WITH AN AIR FLOW REVERSER

[75] Inventors: Knud Jespersen, Terracotta; Guy E. Buller-Colthurst, Rexdale; Hans L. Bergner, Mississauga, all of Canada

[73] Assignee: Knud Simonsen Industries Limited, Rexdale, Canada

[21] Appl. No.: 96,799

[22] Filed: Nov. 23, 1979

Related U.S. Application Data

[63] Continuation-in-part of Ser. No. 959,832, Nov. 13, 1978, Pat. No. 4,250,917.

[51] Int. Cl.³ .............................................. F26B 21/04
[52] U.S. Cl. ...................................... 137/563; 34/191; 137/601
[58] Field of Search ................... 34/191; 98/32, 33 A; 137/563, 601, 625.31, 625.43, 625.44

[56] References Cited

U.S. PATENT DOCUMENTS

| | | | |
|---|---|---|---|
| 1,848,811 | 3/1932 | Welch | 34/191 |
| 2,078,515 | 4/1937 | Sutherland | 34/191 X |
| 2,311,824 | 2/1943 | Gautreau | 34/191 X |
| 2,347,601 | 4/1944 | Jackson | 34/191 X |
| 2,370,886 | 3/1945 | Solberg | 34/191 X |

*Primary Examiner*—Robert G. Nilson
*Attorney, Agent, or Firm*—George A. Rolston; William F. Frank

[57] ABSTRACT

An air flow reverser apparatus for use in association with an air flow system having air supply and return port means, said apparatus comprising a main supply duct, and a main return duct, said ducts being connectable to said respective supply and return port means of said air flow system, at least two branch supply ducts communicating with said main supply duct, at least two branch return ducts communicating with said main return duct, supply damper means for selectively shutting off at least one of said branch supply ducts, while leaving at least one said branch supply duct open, return damper means for selectively shutting off at least one of said branch return ducts while leaving at least one said branch return duct open, and means interconnecting said supply and return damper means whereby when a selected one of said branch supply ducts is closed, a selected one of said branch return ducts is open, and power operated means for moving the same from one position to another simultaneously.

5 Claims, 9 Drawing Figures

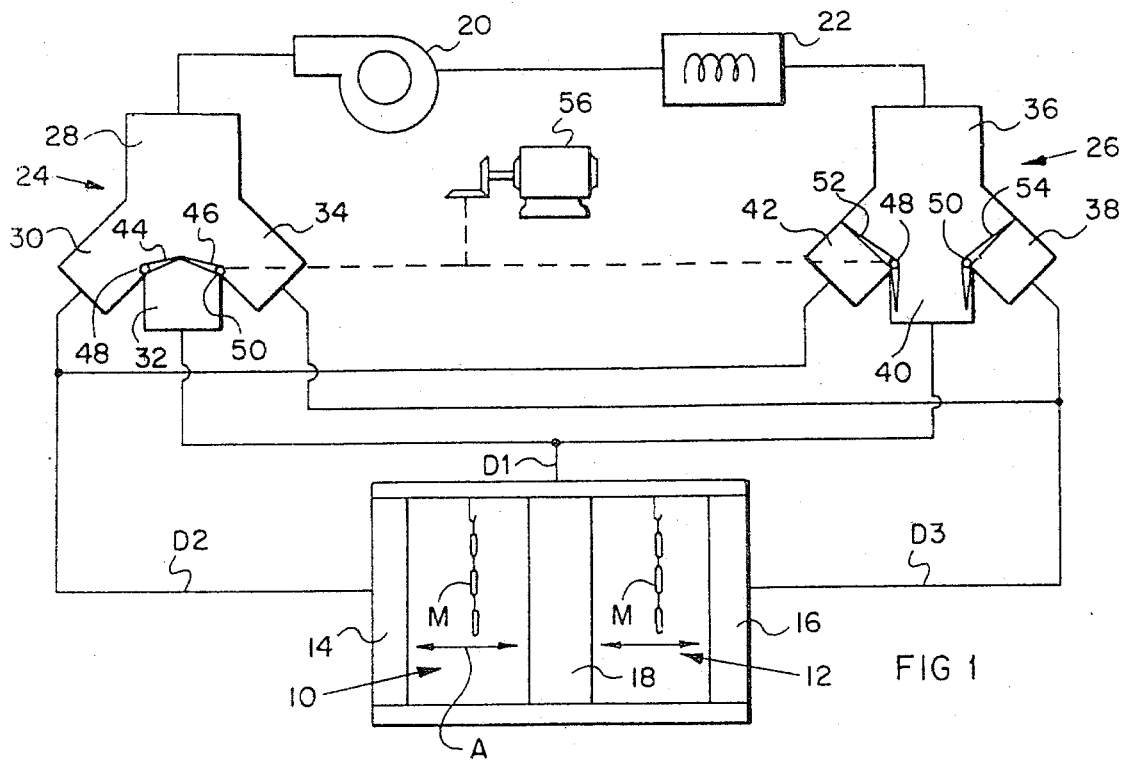
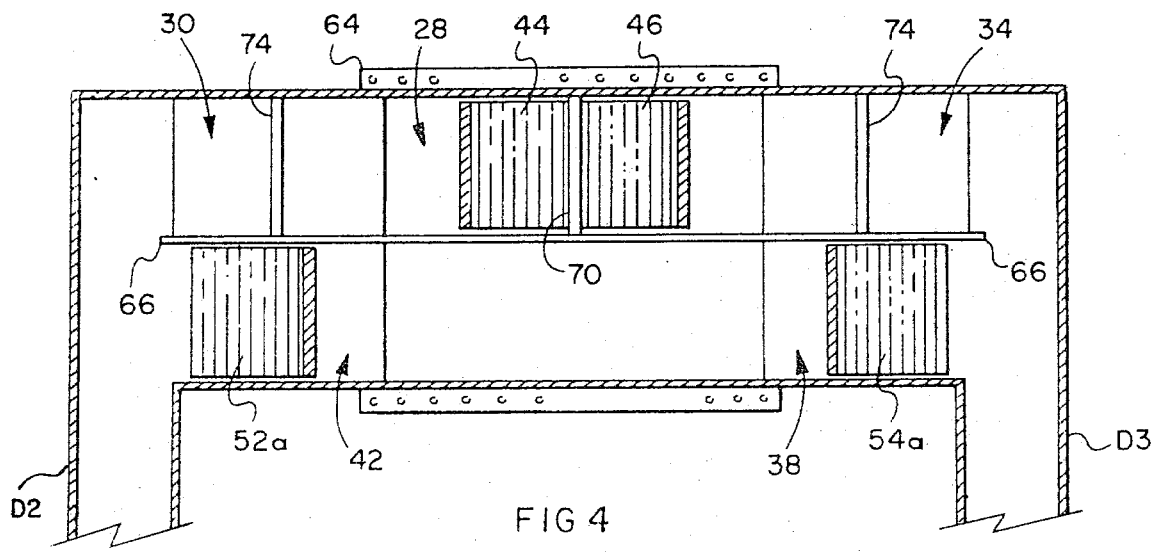
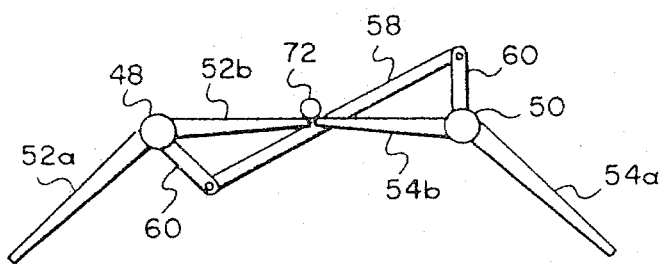
FIG 1
FIG 4
FIG 7

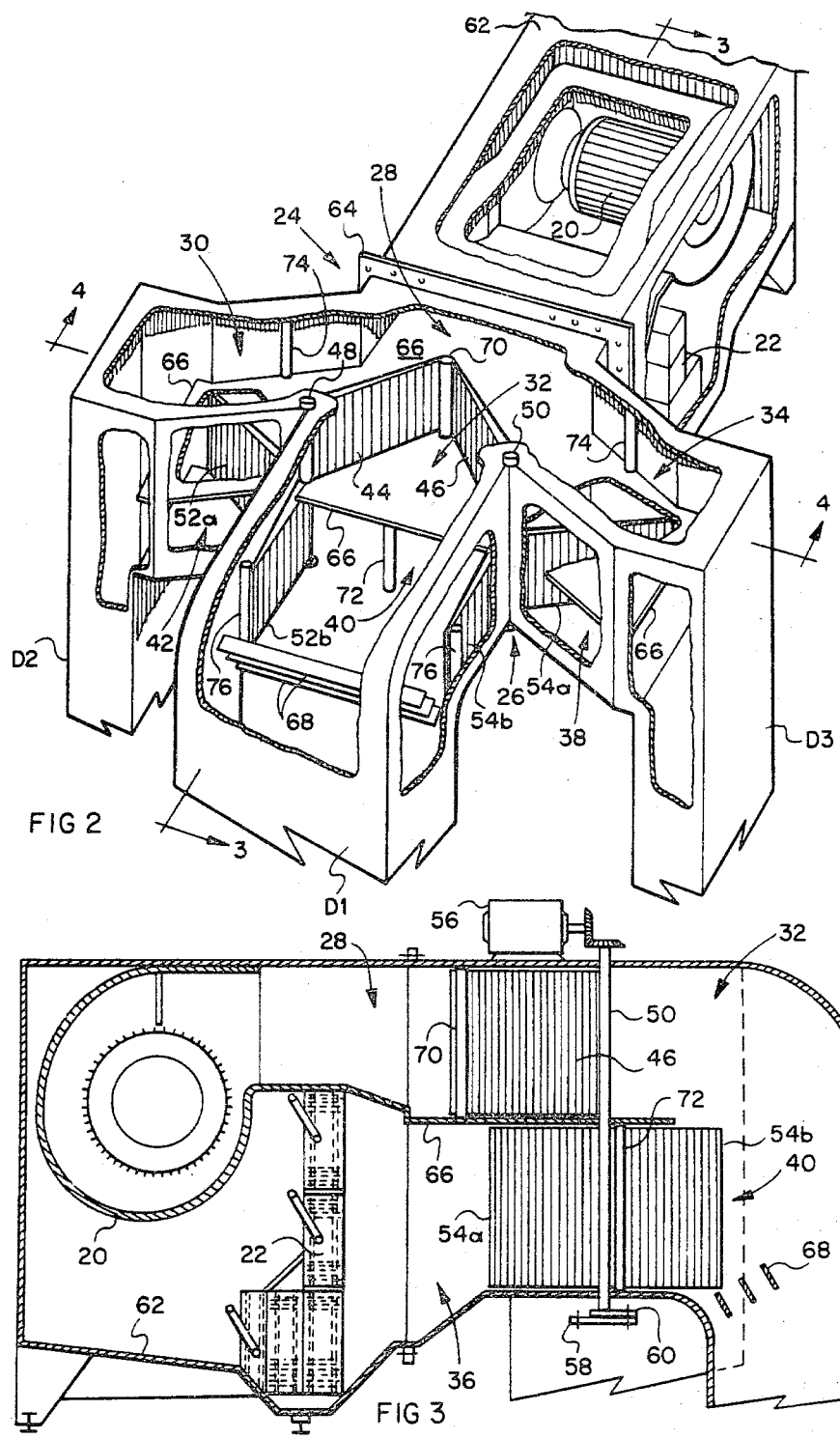

PROCESSING CHAMBER WITH AN AIR FLOW REVERSER

This application is a Continuation-In-Part of U.S. patent application Ser. No. 959,832, filed Nov. 13, 1978 entitled "Air Flow Reverser System" now U.S. Pat. No. 4,250,917.

The invention relates to a processing chamber with an air flow reverser for use in association with fan systems and in particular to a processing chamber in which air flow is produced in two alternate directions.

BACKGROUND OF THE INVENTION

Where an air flow system employs supply and return ducts, and a fan system for circulating air therethrough, it is sometimes desireable to provide that the direction of air flow can be reversed so that the return ducts become the supply ducts and the supply ducts become the return ducts.

This of course can be achieved by using two fans. In the majority of cases however this is too costly. In addition, if the circulation system also incorporates some form of air treatment such as heating or cooling coils or humidifiers and the like, or electronic air cleaners then the use of two fans does not solve the problem.

Proposals have been made whereby the actual fan itself is reversable ie air can flow through the fan rotor in either direction. These systems however suffer from various technical disadvantages. In the great majority of cases, the engineering of the fan system will be such that the greatest efficiency is obtained only in a preferred direction. When the fan is reversed, there is usually a considerable loss in efficiency. In certain other circumstances, various forms of moveable baffles have been proposed so that the direction of air flow may be reversed. Again however such systems almost invariably operate at maximum efficiency only in one condition.

In the particular circumstances of the present invention, it is desirable that the volumes of air flow in either direction shall be essentially equal, so that air flows take place in either direction with equal efficiency. The present invention is particularly designed to be applied to the provision of air circulation in chambers or "ovens" used for processing meat products for example drying, smoking or chilling etc. of such products. Usually this takes place over fairly extended periods of time, for example twenty-four hours or more, at a predetermined temperature and at a predetermined humidity range within the chamber whereby the meat products are subjected to such processing under carefully controlled conditions to produce predictable results, time after time during treatment.

Such meat products are treated in fairly large batches, and it is of course desireable that all the meat products in any one batch shall be subjected to more or less precisely the same air temperature and humidity so that they are all processed simultaneously to the same extent.

For this purpose, the meat products are subjected to transverse air flow through the chamber, and the air flow through the chamber is reversed at predetermined time intervals so that all of the meat products are treated to the same extent.

BRIEF SUMMARY OF THE INVENTION

In order to overcome these various problems, the invention comprises a processing chamber with an air flow reverser for use in association with an air flow system having air supply and return port means, and in which the air flow reverser has, a main supply duct, and a main return duct, said ducts being connectible to said respective supply and return port means of said air flow system, at least two branch supply ducts communicating with said main supply duct, at least two branch return ducts communicating with said main return duct, supply damper means for selectively shutting off at least one of said branch supply ducts, while leaving at least one said branch supply duct open, return damper means for selectively shutting off at least one of said branch return ducts while leaving at least one said branch return duct open, and means interconnecting said supply and return damper means whereby when a selected one of said branch supply ducts is closed, a selected one of said branch return ducts is open, and power operated means for moving the same from one position to another, simultaneously and such branch supply and return ducts communicating with the processing chamber in different locations so that air flow takes place from the sides, to the centre of the chamber, in one mode, and from the centre to the sides in the other mode of operation.

In use, assuming the chamber has at least two air vent openings, one of each of the branch supply ducts and branch return ducts is connected to one vent opening, and another of each of the branch supply ducts and branch return ducts is connected to another vent opening. In this way air can be supplied to one of the vent openings and withdrawn through the other, thus procuring air flow in either direction.

Such a chamber may of course have several such vent openings, and they may be arranged so that one group of openings is connected to one pair of branch supply and return ducts, and the other group of openings to the other pair of branch supply and return ducts. In accordance with the invention, a single chamber is used, and air flow in two alternate directions is provided by the use of side ducting and outlets, on opposite sides of the chamber, and centre ducting and outlets in the centre of the chamber, such ducting being connected to an air flow reverser according to the invention so that air flow takes place either from the sides, to the centre, or from the centre to the sides, alternately.

For this purpose, the air flow reverser has a main supply duct, and a main return duct, three branch supply ducts connecting with said main supply duct, and three branch return ducts connecting with said main return duct, supply damper means operable selectively for closing of either two, or one of said branch supply ducts, return damper means for selectively closing of either two or one of said return branch ducts in unison, whereby when one of said damper means is closing of two said ducts the other of said damper means is closing of only one of said ducts, and power operated means for moving the same from one position to the other.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

In the drawings;

FIG. 1 is a schematic illustration showing the use of the air reverser apparatus, in association with meat curing chambers;

FIG. 2 is an upper perspective view of the air reverser apparatus, cut-away to reveal its interior;

FIG. 3 is a section along the line 3—3 of FIG. 2;

FIG. 4 is a section along the line 4—4 of FIG. 2;

FIG. 7 is a schematic of the damper blades and linkage;

DESCRIPTION OF A SPECIFIC EMBODIMENT

Figure 5:
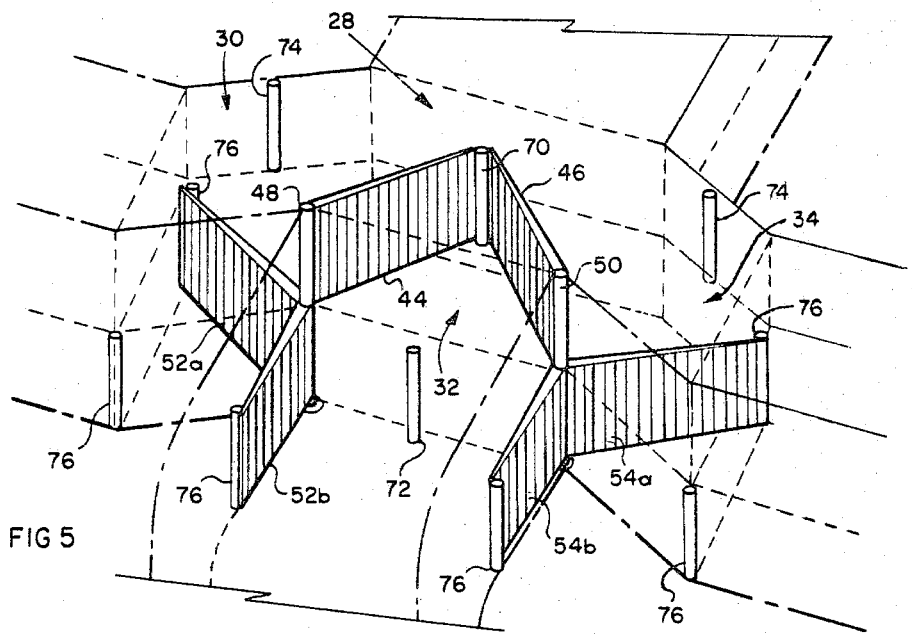
FIG. 5 is a schematic illustration of the apparatus, the entire duct work being shown in phantom, and showing the damper means in one position, corresponding to FIG. 2.

Referring to FIG. 1, the air flow reverser is shown as applied to a dual chamber installation. However, it is equally applicable to a single chamber as will be explained below. In FIG. 1 two meat curing chambers or "ovens" 10 and 12 are shown, containing meat products M suspended therein by any suitable means. It will of course be understood that such chambers are of considerable size, and may contain many thousands of pounds of meat products, which will be treated over a lengthy period of, for example, 24 hours.

During this time the process which may be chilling, curing, drying or smoking etc., is carried out by means of flowing air transversely across the interior of each of the chambers first in one direction for a period of time, and then in the reverse direction for a period of time.

The air will be at a controlled temperature having a predetermined humidity, so as to produce a predetermined predictable treatment of the meat products.

The meat chambers 10 and 12 comprise outer air plenum wall chambers 14 and 16, and an intermediate plenum wall chamber 18. The chamber walls are provided with wall surfaces which are essentially perforated, or define a large number of air flow openings over the whole extent of the wall, with such openings being provided on both sides of the intermediate wall 18. In one mode of operation air may flow through the walls 14 and 16 across the chambers 10 and 12 and be exhausted through wall 18. In the other mode of operation, air is supplied through wall 18 across both chambers 10 and 12 and is exhausted through walls 14 and 16, air flow taking place essentially in the direction in the arrow A depending upon the mode of operation.

The purpose of the invention is to provide an air flow reverser, which may direct the air either to the side walls 14 and 16, and return it via the wall 18, or alternatively may direct air to the wall 18 and return it via the walls 14 and 16. The air is cycled continuously round in a closed circuit, and is subjected to suitable treatment to maintain preset conditions.

In FIG. 1 the various connecting ducts are shown as single lines and indicated by the reference D, for the sake of simplicity. It will however, be appreciated that very large volumes of air are being moved in a gently flowing manner and in fact, such ducts will be of considerable size, in accordance with the requirements well known in the art.

Air flow is maintained by means of a fan 20, and air chilling or heating and humidification or dehumidification is carried out by the air treatment unit indicated at 22, the details of which are omitted for the sake of clarity. Typically the unit 22 will comprise known heat exchanger coils, and may include smoke venting means, or other air treatment (not shown).

The air directors according to the invention are illustrated schematically as a supply driector unit 24, and a return director unit 26. It will be noted that the supply director 24 is connected to the outlet of the fan 20, and the return director 26 is connected to the upstream end of the tempering unit 20.

Again, the illustration of FIG. 1, for the purposes of clarity shows the two director units 24 and 26 as being separate structures.

However, as will be seen from the following description they are in fact constructed essentially in a one piece integral structure, with the supply unit 24 being located above and the return unit 26 being located beneath, the two units being separated essentially by a single partition wall.

The supply director unit 24 comprises a main supply duct 28, and three branch supply ducts 30, 32 and 34. The central branch duct 32 is seen to be connected via a duct D1 to the intermediate partition wall 18 of ovens 10 and 12.

The two side branch ducts 30 and 34 are connected respectively via ducts D2 and D3 to side walls 14 and 16 of ovens 10 and 12.

In this way, if supply air is directed so as to flow only through the central branch duct 32, then it will be supplied via duct D1 to the intermediate wall 18.

On the other hand if air is controlled so that it may flow only through the two branch ducts 30 and 34 and not through the central duct 32, then air will be supplied via ducts D2 and D3 to the two side walls 14 and 16.

The return director unit 26 comprises a main return duct 36, and three branch return ducts 38, 40 and 42. The central branch return duct 40 is connected by duct D1 to the intermediate partition wall 18, and the two side branch return ducts 38 and 42 are connected via ducts D2 and D3 to side walls 16 and 14 of ovens 10 and 12.

In this way, when the central branch return duct 40 is open and the two side branch return ducts are closed, then air may be exhausted through intermediate wall 18. Conversely, when the central branch return duct 40 is closed and the two side branch ducts 42 and 38 are open, then air may be exhausted via walls 14 and 16.

In order to control flow of air within the respective director units 24 and 26, a system of moveable damper blades are provided. The supply director unit 24 is provided with a pair of single damper blades 44 and 46 mounted respectively on shafts 48 and 50.

The return director unit 26 is provided with a pair of double bladed dampers 52 and 54 also mounted on shafts 48 and 50. Rotation of shafts 48 and 50 will thus procure rotation both of damper blades 44 and 46 and double damper blades 52 and 54.

Figure 6:
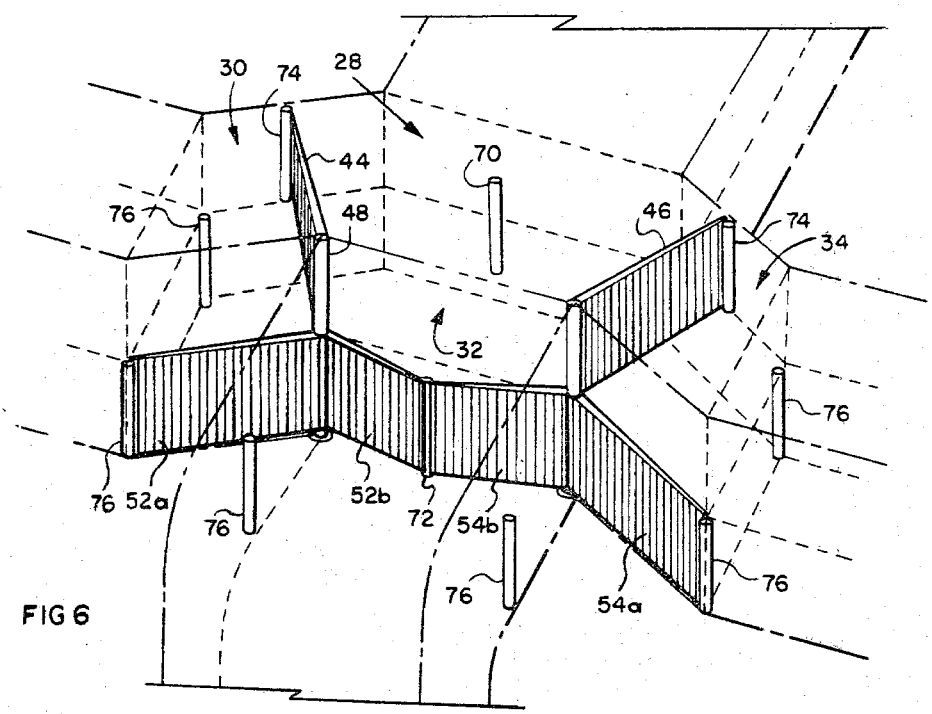
FIG. 6 is an illustration corresponding to FIG. 5, showing the damper means in the opposite position.

Rotation of such shafts 48 and 50 is procured by any suitable motor means such as motor 56, driving one of the shafts, and any suitable linkage means such as the rod 58, may couple the shafts through cranks 60 (see FIG. 6). The linkage 58 may be located underneath the return director unit 26, or may equally well be located on the top, wherever it is most convenient.

As best shown in FIGS. 2, 3 and 4, the two director units 24 and 26 are composed of sheet metal forming generally rectangular ductwork, in a manner known in the art.

In addition, the fan 20 and coils 22 are enclosed within a sheet metal housing 62, which is coupled to main supply duct 28 and main return duct 36 as at the flange 64.

A horizontal partition wall 66 separates the main supply duct 28 from the main return duct 36, and extends between the single bladed dampers 44 and 46 in the supply duct, and the double bladed dampers 52 and 54 in the return duct.

The same partition wall 66 extends beyond such damper blades so as to separate branch supply ducts 30, 32 and 34 from branch return ducts 38, 40 and 42.

As will be seen from FIG. 2, the duct D1 connects directly with the open ends of the central branch supply duct 32 and the central branch return duct 40, and likewise the duct D2 connects directly with the open ends of branch supply duct 30 and branch return duct 42 and in the same way duct D3 connects directly with the open ends of branch supply duct 34 and branch return duct 38.

In order to smooth out the air flows in duct D1, a series of parallel air director blades 68 are located therein which assist in avoiding turbulence.

In order to limit the movement of the damper blades, a stop post 70 is located in the centre of main supply duct 28, and a similar post 72 is located in the centre of branch return duct 40.

In addition, similar posts 74 are located towards the side of branch supply ducts 30 and 34, and posts 76 are located along the sides of branch return duct 40.

Similar posts 76 are located on the side walls of branch return ducts 38 and 42 (see FIGS. 5 and 6).

The operation of the air director units of the invention is best understood with reference to FIGS. 5 and 6.

In the first mode of operation as shown in FIG. 5, the damper blades 44 and 46 are moved across into contact with central post 70, thereby shutting off central branch supply duct 32, and opening the side branch supply ducts 30 and 34.

The double damper blades 52 and 54 are swung so that the damper blades 52a and 54a are in contact with post 76 shutting off side branch return ducts 38 and 42, and the damper blades 52b and 54b are swung apart, contacting the posts 76 on the side walls of central branch return duct 40, thereby opening up branch duct 40.

Operation of fan 20 will procure flow of air into main supply duct 20, and it will then be split into two streams by the damper blades 44 and 46, which being located at a more or less 45° angle to the direction of flow of air, effectively split or divide the air and guide one half down side branch supply duct 30 and the other half down side branch supply duct 34.

Such air flow will then be carried down ducts D2 and D3 into walls 14 and 16. It will then flow across chambers 10 and 12, and be exhausted through wall 18 and duct D1.

Exhaust or return air will then flow up duct D1, and into central branch return duct 40 and directly therethrough into main return duct 36, through the coil 22 and back into the fan 20.

Air circulation is thus continuous and uninterupted.

After a predetermined period of time, for example one hour, motor 56 is operated so as to rotate shaft 50 in a clockwise manner and shaft 48 in an anti-clockwise manner. This will cause damper blades 44 and 46 to swing apart and eventually contact post 74 on the side walls of branch ducts 30 and 34. Thus branch duct 30 and 34 will be closed off and central branch supply duct 32 will be opened up.

Similarly, the damper blades 52 and 54 will also be swung, bringing blades 52a and 54a into contact with the opposite post 76 on the side walls of branch return ducts 38 and 42 thereby opening up branch supply ducts 38 and 42, and damper blades 52b and 54b will be swung together into contact with post 72 thereby closing off central branch return duct 40 (see FIG. 6). In this mode of operation, air will flow from fan 20 directly through main supply duct 28 and central branch supply duct 32 into duct D1, and will flow into wall 18 from which it will flow outwardly in both directions across chambers 10 and 12.

Air from chambers 10 and 12 will be exhausted through walls 14 and 16 and back up through ducts D2 and D3, and will return through side branch return ducts 38 and 42 and then enter main return duct 36 and pass through the coils 22 and back into the fan 20.

Circulation of air in this mode of operation is also continuous and uninterupted until operation of motor 56 once more.

It will be noted that in both modes of operation the fan is operating in the same direction, so that the same volume of air flow will take place regardless of which mode of operation is selected.

It will of course be understood that the entire operation will be automatically timed and controlled with suitable thermostats and humidification and other controls, and timers for the operation of the motor 56, all of which are well known in the art and are omitted for the sake of clarity.

It will of course be appreciated that while the air flow reverser is described as applicable to a pair of adjacent chambers or ovens, the two such chambers essentially may be considered as two halves of a single chamber, divided by a median partition wall.

Such an air flow reverser is equally applicable to the distribution of air within a single chamber, without the use of the median wall dividing it in two.

Figure 8:
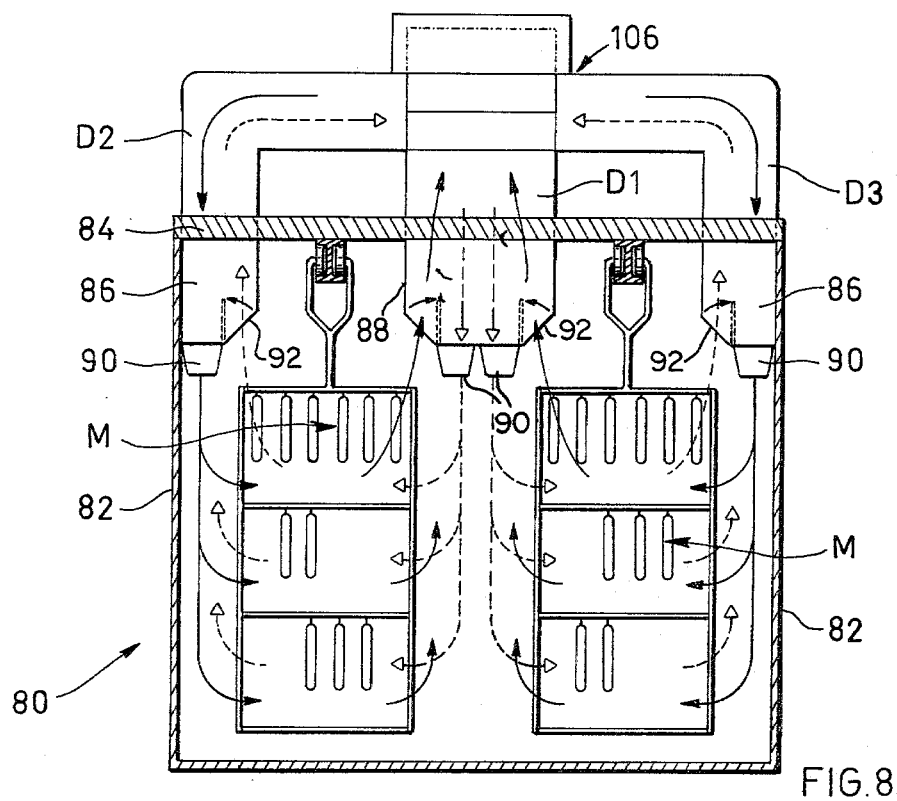
FIG. 8 is a schematic elevation of the invention as applied to a single chamber, and, FIG. 9 is a schematic of a detail of FIG. 8 shown partially in section.
Figure 9:
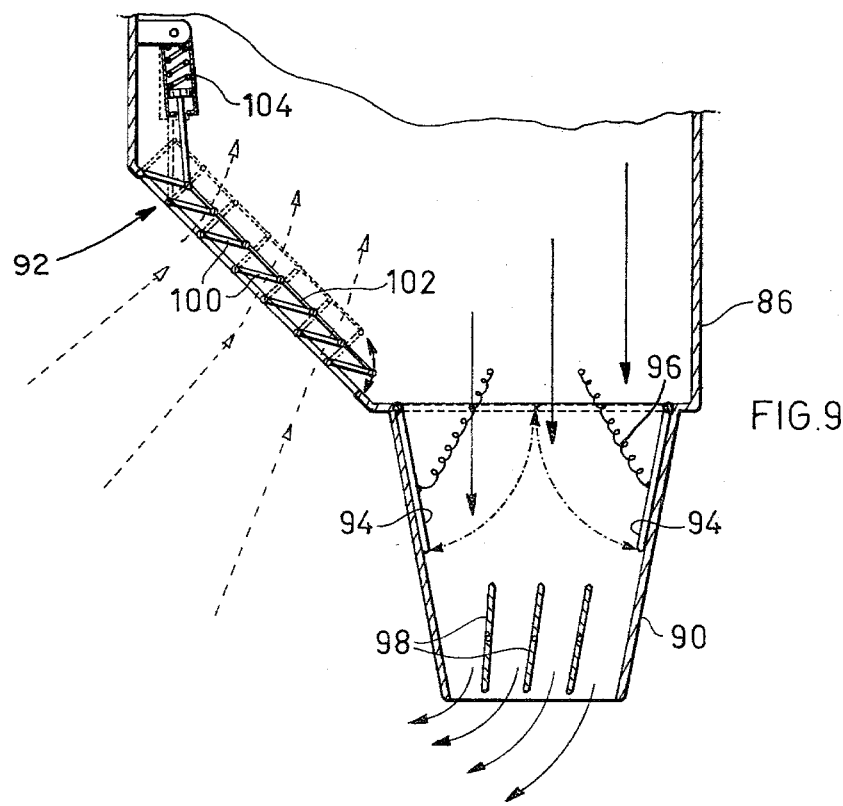

Such a single chamber layout is shown in FIGS. 8 and 9.

A single large chamber or oven is shown generally as 80, having side walls 82 and a top wall 84.

It is arranged and dimensioned to receive two racks of meat products indicated generally as M, suspended side by side on suitable hanger systems such as are known in the art.

In order to provide a uniform temperature and atmospheric condition throughout the space occupied by the two racks of meat products M, the chamber or oven 80 is provided with side ducts 86, and a central duct 88, extending downwardly from the upper wall 84.

The side ducts 86 and central duct 88 are all provided with downwardly directed air registers or outlets 90, and inlet openings or registers 92.

Any suitable damper means are provided within the ducts 86 and 88, associated with the inlet and outlet registers, whereby to close off the inlet registers, when air is flowing outwardly through outlets 90, and similarly, damper means are provided to close off the outlet registers 90 when air is flowing inwardly through registers 92.

One form of such a damper mechanism is shown in FIG. 9, although it will be appreciated that various other configurations may be used.

In this case, the outlet register 90 is seen to be provided with a pair of trapdoor-like damper blades 94 operated by means such as springs 96.

Pressure of air within duct 86 will displace the dampers 94 against the springs 96 thereby permitting air to flow out through the outlet register 90.

Suitable director blades 98 may be provided as is well-known in the art.

The inlet register 92 may be provided with a different form of damper blade system such as the ladder-type damper blade assembly 100, all of which are pivotally mounted on suitable axle means, arranged parallel with one another whereby to swing between closed and open positions as shown in phantom. An operating link 102 connects the free ends of all of the damper blades 100, and is in turn connected to operating means such as the cylinder 104. Such a cylinder 104 may contain a spring, and some form of fluid damping means.

Alternatively, all of the damper means may be operated by remotely actuated pneumatic or hydraulic cylinders, or by electric motors, or by any other suitable means.

The same arrangement of dampers is provided for all of the inlet and outlet registers for both of ducts 86 and also for centre duct 88.

An air director assembly as described above, in connection with FIGS. 1 to 7, is shown generally as 106, and is mounted above top wall 84. Duct D1 of such air director assembly is connected with the centre duct 88, and ducts D2 and D3 are connected with the side ducts 86.

It will thus be seen, that the operation of the air director assembly, and its associated fan means 20 and coil 22, air can be supplied either outwardly through side ducts 86, and will then flow downwardly alongside either side wall 82, and will be drawn back in through duct 88, in one mode of operation. In the second mode of operation air will be supplied to the chamber through the duct 88 and outlets 90 and will flow downwardly between the two racks of meat products M, and then will be drawn upwardly again through ducts 86.

In this way, air flow through the two racks of meat products is equalized and rendered uniform, so that a uniform temperature and humidity is maintained throughout all of the meat products simultaneously producing an even curing or treatment of such meat products.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A processing chamber with air flow reverser apparatus for use in association with an air flow system having air supply and return port means, said air flow reverser having;
    a main supply duct, and a main return duct, said ducts being connectable to said respective supply and return port means of said air flow system;
    at least two branch supply ducts communicating with said main supply duct;
    at least two branch return ducts communicating with said main return duct;
    supply damper means movably operable for selectively shutting off at least one of said branch supply ducts, while leaving at least one said branch supply duct open;
    return damper means movably operable for selectively shutting off at least one of said branch return ducts while leaving at least one said branch return duct open;
    means interconnecting said supply and return damper means for movement in unison whereby when a selected one of said branch supply ducts is closed, a selected one of said branch return ducts is open;
    power operated means for moving the same from one position to another simultaneously and wherein said processing chamber comprises;
    chamber means defining two chambers arranged side by side through which air is passed by said air flow system;
    side duct means in said chamber means, and,
    centre duct means defining an intermediate partition wall located between and separating said two chambers from one another, and defining a hollow interior, through which air may flow in either direction as aforesaid, said centre duct means being connected to one of said branch supply ducts and to one of said branch return ducts, and said side duct means being connected to at least one other of said branch supply ducts and branch return ducts whereby air may be caused to flow in said chamber means either from said side duct means to said centre duct means or from said centre duct means to said side duct means.

2. A processing chamber with air flow reverser apparatus, as claimed in claim 1, wherein said side duct means comprise hollow side walls on the outer sides of said chambers, permitting air to flow in either direction aforesaid.

3. A processing chamber with an air flow reverser for use in association with an air flow reverser having air supply and return port means, and in which the air flow reverser has air supply and return means, at least two branch supply ducts connected with the air supply means and at least two return ducts connected with the air return means, and damper means movable between at least two positions, in one of the positions, shutting off at least one of the branch supply ducts and at least one of the branch return ducts, and in the other positions shutting off at least one other of said branch supply ducts and branch return ducts, and having means for moving said damper means between said at least two positions, and wherein said processing chamber comprises;
    wall means, including side walls and a top wall, defining a chamber for reception of products to be processed therein;
    side duct means located adjacent to said side walls on opposite sides of said chamber, and connected to respective said branch supply and return duct means;
    centre duct means located along a median of said chamber between said opposite side walls, and connected to another of said branch supply ducts and another of said branch return ducts;
    air outlet means forming part of said side duct means and said centre duct means and directed downwardly for ejecting air downwardly towards the bottom of said chamber, and, air intake means on said side duct means and on said centre duct means whereby air may be withdrawn from said chamber, whereby air may be ejected by said side duct means downwardly into said chamber, and withdrawn back into said centre duct means, in one mode of operation, and, in another mode of operation, air may be ejected downwardly from said centre duct means and withdrawn from said chamber through said side duct means, whereby to procure flow of air in two alternate directions within said processing chamber.

4. A processing chamber as claimed in claim 3 including air flow control means for said air outlets, and air flow control means for said air inlet means.

5. A processing chamber as claimed in claim 4 including air pressure responsive means for controlling operation of said air flow control means.

* * * * *